United States Patent
Johnson et al.

(10) Patent No.: US 11,769,257 B2
(45) Date of Patent: Sep. 26, 2023

(54) SYSTEMS AND METHODS FOR IMAGE AIDED NAVIGATION

(71) Applicant: Honeywell International Inc., Morris Plains, NJ (US)

(72) Inventors: Benjamin Lee Johnson, Brooklyn Park, MN (US); Vibhor L Bageshwar, Minneapolis, MN (US); Srivatsan Varadarajan, St. Louis Park, MN (US)

(73) Assignee: Honeywell International Inc., Charlotte, NC (US)

( * ) Notice: Subject to any disclaimer, the term of this patent is extended or adjusted under 35 U.S.C. 154(b) by 1,154 days.

(21) Appl. No.: 16/426,733

(22) Filed: May 30, 2019

(65) Prior Publication Data
US 2023/0230256 A1    Jul. 20, 2023

(51) Int. Cl.
*G06T 7/246* (2017.01)
*G06T 7/20* (2017.01)

(52) U.S. Cl.
CPC .................. *G06T 7/246* (2017.01); *G06T 7/20* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,065,053 B2 | 11/2011 | Stam et al. | |
| 8,428,305 B2 | 4/2013 | Zhang et al. | |
| 10,282,617 B2* | 5/2019 | Chen et al. | G06V 20/41 |
| 11,182,043 B2* | 11/2021 | Luckey et al. | G06T 19/20 |
| 2006/0018516 A1* | 1/2006 | Masoud et al. | G06T 7/254 |
| | | | 382/115 |
| 2008/0226192 A1* | 9/2008 | Silverstein et al. | H04N 23/73 |
| | | | 348/E.5037 |
| 2008/0309517 A1* | 12/2008 | Saito | B60R 1/00 |
| | | | 340/937 |
| 2010/0165102 A1* | 7/2010 | Klebanov et al. | B60Q 1/115 |
| | | | 348/135 |
| 2014/0184798 A1 | 7/2014 | Wedajo et al. | |
| 2014/0264081 A1* | 9/2014 | Walker et al. | G01B 11/14 |
| | | | 250/206.1 |

(Continued)

OTHER PUBLICATIONS

European Patent Office, "Communication pursuant to Article 94(3) from EP Application No. 20166028.9", from Foreign Counterpart to U.S. Appl. No. 16/426,733, Jan. 18, 2022, Page(s) 1 through 6, Published: EP.

(Continued)

*Primary Examiner* — Reza Aghevli
(74) *Attorney, Agent, or Firm* — Fogg & Powers LLC

(57) ABSTRACT

In one embodiment, a vision aided navigation system comprises: at least one image sensor configured to produce image frames of a surrounding environment; a feature extractor configured to extract at least one image feature from a first image frame; a navigation filter configured to output a navigation solution based navigation data from a navigation device and changes in position of the image feature in the images; a feature tracker to receive the image frames and predict a location of the image feature in a subsequent image frame; a dynamic localized parameter adjuster to adjust at least one image parameter of the subsequent image frame; and wherein the feature tracker is configured so that when the image feature cannot be identified in the subsequent image frame within a bounded region around the predicted location, the dynamic localized parameter adjuster adjusts the at least one image parameter within the bounded region.

12 Claims, 6 Drawing Sheets

(56) References Cited

U.S. PATENT DOCUMENTS

| 2014/0276937 | A1* | 9/2014 | Wong et al. ........... A61B 17/00 |
| | | | 606/130 |
| 2014/0324339 | A1* | 10/2014 | Adam et al. ......... G01S 13/726 |
| | | | 701/519 |
| 2016/0227228 | A1* | 8/2016 | Pomeroy et al. ...... H04N 5/772 |
| 2018/0134288 | A1* | 5/2018 | Schulter et al. ....... G08B 21/02 |
| 2020/0021775 | A1* | 1/2020 | O'Connell et al. ..... G08C 15/06 |
| 2020/0021776 | A1* | 1/2020 | Cullinane et al. ....... H04N 5/44 |
| 2020/0077892 | A1* | 3/2020 | Tran .................. G08B 21/0492 |
| 2020/0167059 | A1* | 5/2020 | Luckey et al. ........ G06F 3/0482 |
| 2021/0157312 | A1* | 5/2021 | Cella et al. ......... G05B 19/4184 |
| 2022/0027038 | A1* | 1/2022 | Luckey et al. .......... G06F 3/167 |
| 2022/0066456 | A1* | 3/2022 | Ebrahimi Afrouzi et al. ............. |
| | | | B25J 9/1697 |

OTHER PUBLICATIONS

European Patent Office, "Extended European Search Report from EP Application No. 20166028.9", from Foreign Counterpart to U.S. Appl. No. 16/426,733, Sep. 1, 2020, Page(s) 1 through 14, Published: EP.

Krieger et al., "Intensity and resolution enhancement of local regions for object detection and tracking in wide area surveillance", Mobile Multimedia/lmage Processing, Secutiry, and Applications, 2015, Page(s) 1 through 11, Volume 9497, 949705, Proc. of Spie.

\* cited by examiner

SYSTEMS AND METHODS FOR IMAGE AIDED NAVIGATION

STATEMENT REGARDING FEDERALLY SPONSORED RESEARCH OR DEVELOPMENT

This invention was made with U.S. Government support under FA8750-16-C-0043 awarded by AFRL and DARPA. The U.S. Government has certain rights in the invention.

BACKGROUND

Vision based sensors, such as cameras, are often used in conjunction with vehicle navigation systems to aid in navigation under circumstances where information received from primary navigation sensors (such as Global Navigation Satellite System receivers) may be degraded or unavailable. For example, vision-based sensors can be used to track features captured in images of the vehicle's surroundings to aid an inertial measurement unit in computing navigation solutions. Further, vision-based sensors can be used to track features in the operating environment of the vehicle to enable navigation, guidance, object identification, and other forms of autonomous operation. However, while such vision-based sensors are typically calibrated for operating under a predefined set of environmental conditions (for example, conditions such as the amount of ambient light and moisture content in the atmosphere), it can be expected that the vehicle will experience dynamic environmental conditions that vary over time during vehicle operation. Such changes in environmental conditions can alter the ability of a system to interpret its environment. For example, the number or quality of features available for a vision-based system to extract from captured images may change with environmental conditions. Extracted features inherently provide more useful navigation data the longer they are tracked. As such, when features become obscured or are lost, their ability to aid the navigation system is substantially diminished.

SUMMARY

A vision aided navigation system is provided. The system comprises: at least one image sensor, wherein the at least one image sensor is configured to produce a plurality of image frames of a surrounding environment; a feature extractor coupled to the at least one image sensor, wherein the feature extractor is configured to extract at least one image feature from a first image frame from the plurality of image frames captured by the at least one image sensor; a navigation filter configured to output a navigation solution based on an input of navigation data from at least one navigation device and further based on changes in position of the at least one image feature in the plurality of images; a feature tracker configured to receive the plurality of image frames and configured to predict a location of the at least one image feature in at least one subsequent image frame taken by the at least one image sensor; a dynamic localized parameter adjuster configured to adjust at least one image parameter of the at least one subsequent image frame; and wherein the feature tracker is configured so that when the at least one image feature cannot be identified in the at least one subsequent image frame within a bounded region around the predicted location, the dynamic localized parameter adjuster adjusts the at least one image parameter within the bounded region.

DRAWINGS

Understanding that the drawings depict only some embodiments and are not therefore to be considered limiting in scope, the exemplary embodiments will be described with additional specificity and detail using the accompanying drawings, in which.

Figure 1:
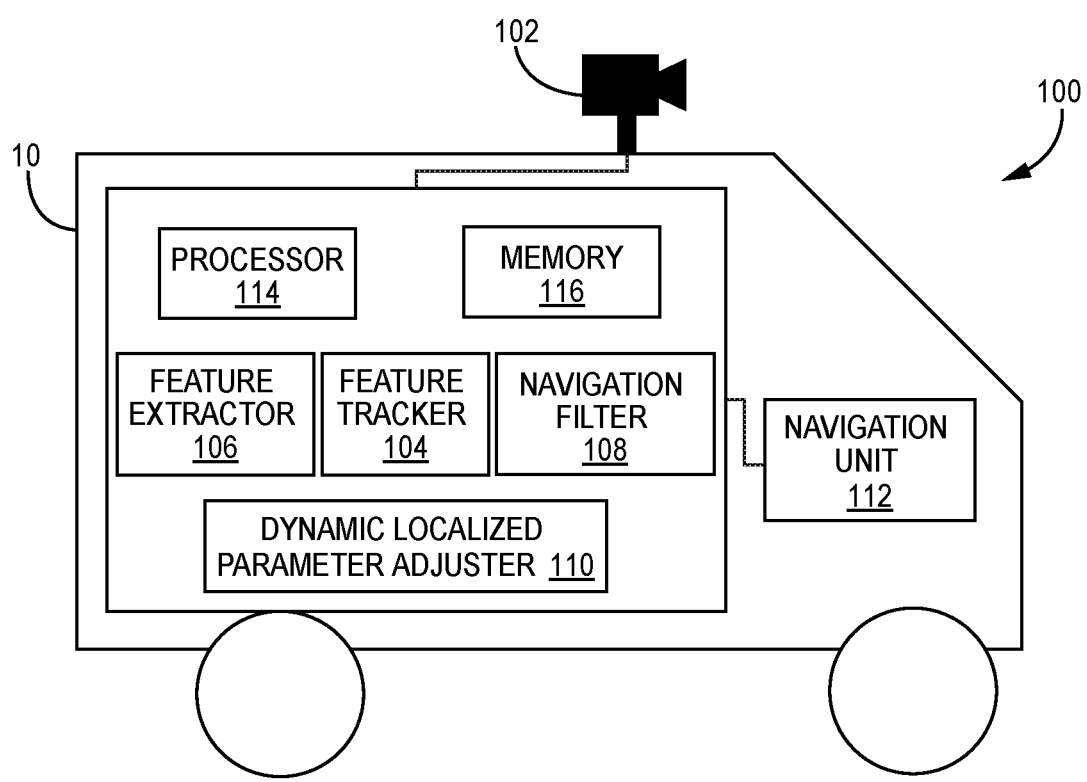
FIGS. 1 and 1A are block diagrams of an example embodiment of a vision aided navigation system of the present disclosure.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Embodiments of the present disclosure provides a system and methods that allow a vehicle's vision-based navigation system to better adapt to dynamic environmental conditions by applying targeted image enhancement processing to captured image frames when tracked features fail to appear in or near their predicted locations. That is, when a feature is extracted from a given position in a captured image frame, its position in a subsequently captured second image frame can be accurately predicted given estimates of vehicle kinematics (e.g. position, velocity, acceleration and heading) from the navigation system of how the vehicle is believed to have moved between the time the first and second image frames were captured and correspondingly how the feature has to be scaled, translated and rotated accordingly. If the tracked feature appears precisely in the second image frame where predicted, then this determination validates that the navigation solutions being generated by the vehicle navigation system are accurate. If the tracked feature position appears in the second image frame in a location close to, but offset from, where it was predicted to appear, and/or oriented differently from the prediction then this determination indicates that some errors may exist in the navigation solutions being generated by the vehicle navigation system, and the detected position and orientation error may be fed back to the navigation system for corrections to the navigation estimates. However, when due to changes in operating environment a tracked feature can no longer be identified within a bounded region around where the feature was predicted to appear, then that feature cannot be reliably used to aid in judging the accuracy of the navigation solution from the navigation system. Changes in the operating environment that could trigger loss of identification of tracked feature from one frame to another could include, but not limited to, (i) changes in lighting condition impacting captured frame or (ii) motion of the non-stationary object, whose feature is tracked, relative vehicle's motion and/or obstructions in the way of the field of view of the camera. With embodiments of the present disclosure, when a tracked feature is lost from one image frame to the next, image enhancement techniques are applied to the region of the image from where the tracked feature was predicted to appear. That is, as opposed to applying image enhancement to the entire image, image enhancement techniques are only applied a bounded area proximate to where the tracked feature was predicted to appear. In this way, processing time and resources are conserved. The size and shape of the bounded area may be determined based on considerations such as, but not limited to, vehicle speed, stage of operation, the standard deviation of the vehicle position estimates, or the standard deviation of the tracked feature position. While the region may be optimized to a portion of the image, it is understood that the region of the image may encompass the entirety of the image. If the tracked feature then appears and becomes extractable from the second image due to the adjustments, then its position in the second image may be fed back to the navigation system as an aid. If the tracked feature still no longer appears in second image even with the adjustments, the navigation system may then determine whether to discontinue tracking of that feature. In some examples, a set of tracked features may be dynamically updated adding and removing features over a plurality of image frames. The set of tracked features may be used for navigation purposes and to better optimize the region.

FIG. 1 is a block diagram of an example embodiment of a vision aided navigation system 100 for a vehicle 10, according to the present disclosure. It should be understood that the vision aided navigation enabled vehicle 100 described through this disclosure is not limited to any one particular type of vehicle, but may be used in conjunction with any form aircraft, automobile, truck, train, watercraft, spacecraft, etc. As shown in FIG. 1, the vision aided navigation system 100 comprises an image sensor 102 (which in some embodiments may be mounted to the vehicle 10), a feature extractor 106, a feature tracker 104, a navigation filter 108, a dynamic localized parameter adjuster 110, and a navigation unit 112. In the example shown in FIG. 1, the vision aided navigation system 100 includes a processor 114 coupled to a memory 116 and is programmed to execute code for implementing the feature tracker 104, the feature extractor 106, and navigation filter 108, dynamic localized parameter adjuster 110, and other functions described herein attributed to the vision aided navigation system 100.

In the example shown in FIG. 1, the navigation unit 112 is coupled to the vision aided navigation system 100. In some embodiments, the navigation unit 112 may use the output navigation solution from the navigation filter 108 to automate the operation and movements of the vehicle 10. For example, in some embodiments, the navigation unit 112 can provide navigation statistics to the vehicle's guidance system for collision avoidance and/or guide the vehicle to a desired destination. In some examples, the navigation unit 112 in conjunction with the guidance system provides an alarm to the driver of the vehicle 10, or to other components of the vehicle, when a clear and/or unobstructed path to maneuver the vehicle 10 is not immediately available.

Figure 1A:
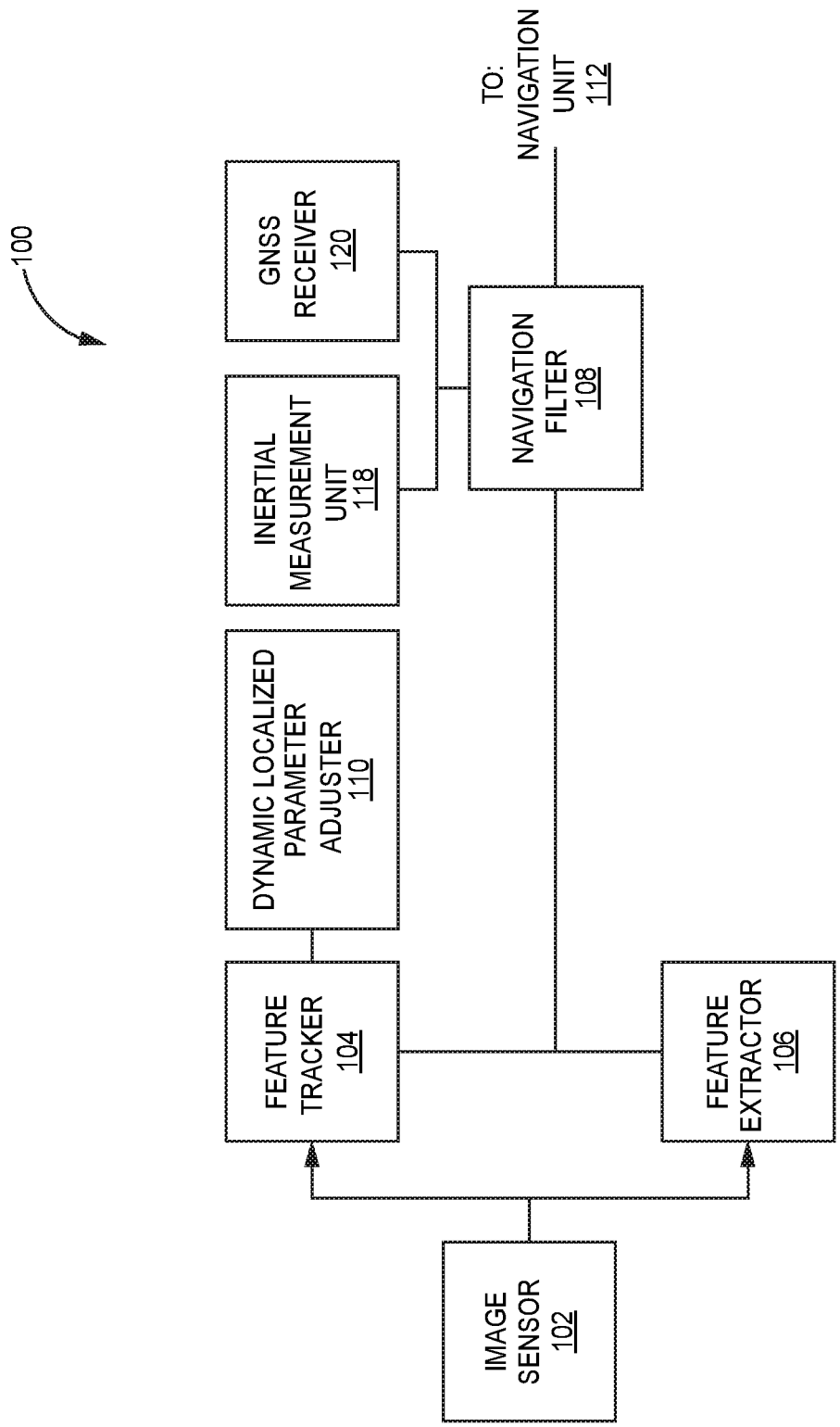

FIG. 1A is a block diagram illustration of one example embodiment of the vision aided navigation system 100. In the embodiment shown in FIG. 1A, the image sensor 102 (which may be mounted to the vehicle 10) is coupled to, and outputs image frames fed to, the feature tracker 104 and the feature extractor 106. The image sensor 102, in various different embodiments, may be implemented using any device capable of capturing images of the physical surroundings of vehicle 10, and outputting image frames of those captured images. For example, in some embodiments, the image sensor 102 may comprise a camera or other sensor that works to capture images in any number of spectrums such as, for example, infrared (IR) visual spectrum, and/or other spectrums of light. The image sensor 102 may be used in alternate embodiments where lighting conditions may vary. For example, the feature tracker 104 and feature extractor 106 can track and extract features from a stationary image sensory 102, such as a security camera, tracking motion of features within a still-frame. Alternatively, the feature tracker can be used in conjunction with satellite imagery as described in other embodiments.

In some embodiments, the image sensor 102 is configured for continuous generation of image frames representing sequences of scenes of the environment surrounding vehicle 10 as captured by the image sensor 102. As such, each captured image frame can be analyzed by the system 100 in relation to a previous and/or subsequent image frame captured by the image sensor 102. Each captured image may be stored in memory 116 or stored in another component. Images generated by the image sensor 102 can be accessed by one or more of the feature tracker 104, the feature extractor 106, and/or the parameter adjuster 110.

In some embodiments, each image generated by the image sensor 102 is stored as a two-dimensional image frame comprising a plurality of identifiable pixels and known pixel dimensions. The pixels of the image frame may be referenced to and analyzed using an array. Each pixel may be identified by the row and column, such that a pixel in one image has a corresponding pixel in a previous or subsequent image. In other embodiments, features within the image frame may be identified and tracked using other methods, such as using vector coordinates to identify the position of features.

Each image frame utilized by the system 100 may capture one or more image features that are representations of objects, or elements of such object, observed by the image sensor 102. As such, the image features as they appear in captured image frames will comprise a group of pixels spatially organized as a geometric entity with sufficient differentiating characteristics (such as contrast, for example) relative to a background such as to be recognizable and distinguishable from the background. For example, an object that exists in the environment of the vehicle 10 and is viewable from the image sensor 102 may be distinguishable from the background. The exact parameters which define a feature as a feature may depend on the implementation of the feature extractor 106. An image feature may be identifiable as a feature in a single image frame, and it may become a feature that is tracked over a plurality of images.

The feature tracker 104 and feature extractor 106 are each configured to process the image frames, discussed above, that are received from the image sensor 102. The feature extractor 106 processes the image frames to identify collections of pixels that have a sufficient correlation of differentiating characteristics as an image feature to qualify as a potential trackable feature to be tracked by the feature tracker 104 over a sequence of image frames. Given the position of an image feature in a first image frame, the feature tracker 104 is configured to estimate (e.g. predict) a position where the tracked image feature should appear in subsequent image fames, given the distance and direction traveled by the vehicle 10 in the intervening time. A number of feature extraction algorithms would be known to those in the art who have reviewed this disclosure to implement the feature extractor 106. Such examples include but are not limited to the Orientation FAST and rotated BRIEF (ORB) algorithm, the Scale-Invariant Feature Transform (SIFT)

algorithm, and the Speeded-Up Robust Features (SURF) algorithm, as well as "data driven" ML-model based approaches.

The feature extractor 106 is configured to extract at least one image feature from each image frame. In some embodiments, the feature extractor 106 may extract any arbitrary number, N, of features from a frame. Image features can be identified through any known means, such as random search or swarm search of image. In some embodiments, the feature extractor 106 takes into consideration the kinematic properties of the vehicle transmitted from the navigation filter 108 to determine which image features appearing in an image frame should be extracted. For example, when the vehicle 10 is moving straight in an unchanging direction, the feature extractor 106 may place a higher weight on the features in the center of the image frame, and less weight to the available features towards the edge of the image frame. The kinematic properties, or kinematic states, of the vehicle may include parameters such as, but not limited to, the three-dimensional position, three-dimensional velocity, three-dimensional acceleration, tilt, yaw, and any other physical property related to vehicle dynamics.

The feature tracker 104 is configured to generate and store feature tracks for the tracked features. Each feature track comprises a set of information relating to the position and other characteristics for an extracted image feature over time. For example, a feature track may comprise a set of coordinates associated with the extracted image feature appearing in a series of image frames. Other information that may be included in the feature track may include, but is not limited to, a relative luminosity and/or a color of the image feature, an estimated velocity of the tracked feature, or if a tacked feature disappears from subsequent images, the number of subsequent image frames in which the tracked feature could not be identified. In some embodiments, the feature track for an associated tracked feature may be stored in the memory 116 and accessed by other components within the vision aided navigation system 100 including the feature extractor, navigation filter 108, and dynamic localized parameter adjuster 110.

In some embodiments, the feature track for a tracked object may include a feature vector that indicates the relative motion of the feature with respect to the vehicle and may include the predicted motion of the feature. The feature vector may include an approximation of the tracked feature's movement alone, the motion of the vehicle relative to the feature, or a combination of the two. The feature vector may contain a mean and a variance of the feature's estimated position. The mean and the variance of the feature's estimated position may be mapped to a bounded region in the image. In some embodiments, the feature vector may be used to estimate the position of the at least one feature in a subsequent image. In some embodiments, the magnitude of the feature vector may be used to determine the size of a bounded area, or bounded region, associated with a tracked image on subsequent image frames, as further discussed below.

The feature tracker 104 may be configured to prioritize a predetermined set of objects based on the properties of the object. The prioritization can be determined apriori and/or determined at a specified runtime (dynamic priority). For example, in one embodiment, the feature tracker 104 is configured to prioritize stationary objects, i.e. buildings, trees, or parked cars. When the feature tracker 104 tracks features associated with an object moving independently from the vehicle 10, i.e. another moving vehicle, that feature is inherently less valuable for the determining the future position of the vehicle 10 as the object's motion is independent of the vehicle. For example, if the feature tracker 104 tracks a feature on another vehicle traveling at the same speed and in the same direction as the vehicle 10, then the feature will appear to be stationary when comparing subsequent image frames. If the feature tracker 104 determines that the tracked feature is moving independently from the vehicle 10, then that feature may be removed as a tracked feature. In some cases, objects that move independent of the vehicle 10 are more likely to quickly exit the field of view of the imaging device 102. Thus, these moving features provide less information to the navigation system 100 as compared to stationary features. A feature becomes more valuable to the navigation system the longer it is tracked, as generally the predicted feature locations become more accurate. As the vehicle moves and feature positions are predicted and measured over time, the features can also be selected to minimize the dilution of precision (DOP), to minimize computation time by selecting features that are relevant or add new information, and to improve the estimated statistics of the vehicle's kinematic state by selecting features that provide optimal geometry. The predicted feature positions allow a concentration on specific regions of the image and the adjustment of image parameters to find features in those regions of the image. A region may be defined such that the center of the region is the mean of the predicted feature location and the shape of the region, such as an ellipse, may be derived from the covariance of the estimated feature position.

The feature tracker 104 sends the predicted location of the image features being tracked to the feature extractor 106. The feature extractor 106 then searches for those image features within the bounded regions associated with each tracked image feature. In some examples, the feature extractor searches for the same type of feature. In other examples, the feature extractor 106 searches for any feature within the enclosed bounded region. The feature tracker 104 attempts to locate in the present image frame the tracked features that appeared in one or more of the previous image frames. The feature tracker 104 uses the previous frame and the locations of the at least one feature from a previous frame to locate the feature in the subsequent frame. The feature tracker 104 may estimate the predicted locations of the tracked features using the feature tracks associated with the features. For example, in one embodiment, the feature tracker 104 searches for an image feature within the current image frame around the region of the predicted location of the feature. If the feature is found, then the feature tracker 104 updates the location of the feature in that feature's feature track in memory 116. In one embodiment, when an extracted feature is identified within the area searched, the feature tracker 104 determines whether that feature is the same feature as a tracked feature from a prior image.

In the example shown in FIG. 1, the navigation filter 108 is coupled to the feature tracker 104. In some embodiments, the navigation filter 108 is also coupled to an inertial measurement unit (IMU) 118 and/or a Global Navigation Satellite System (GNSS) receiver 120, and/or other navigational sensor. In some embodiments, the navigation filter 108 receives the feature tracks from the feature tracker 104 corresponding to one or more of the image features being tracked by the feature tracker 104. The navigation filter 108 uses these feature tracks to aid in the prediction of a navigation solution (for example, the position and velocity of the vehicle 10). In some embodiments, the navigation filter 108 may be implemented using a Kalman filter or other Bayesian algorithm. Based on where a tracked feature appears in (or is missing from) an image frame where predicted, the navigation filter 108 generates a residual, or error state, vector. A low norm of the residual vector indicates that the tracked features appear in the image frame approximately where expected, which means that the navigation filter's estimates of the velocity and position of the vehicle 10 (e.g. as calculated from the IMU 118 and/or GNSS receiver 120 measurements) are likely accurate. As the position of a tracked feature deviates from the expected location in an image frame, the norm of the residual vector generated by the navigation filter 108 will increase, which may, among other things, imply that the navigation filter's estimates of the position and velocity of the vehicle 10, as calculated from the IMU 118 and/or GNSS receiver 120 measurement, are not accurate.

In some embodiments, the navigation filter 108 also provides feedback to the feature tracker 104 and/or the feature extractor 106. This feedback may include approximations of the statistics of the vehicle's kinematic states (e.g. position and velocity). In some embodiments, the feature extractor 106 uses the feedback from the navigation filter 108 to more precisely find and extract features within image frames. In some embodiments, the navigation filter 108 provides the feature tracker 104 with the approximations of the statistics of the vehicle's kinematic states (e.g. position and velocity). The feature tracker 104, in some embodiments, may use the estimated statistics of the vehicle's kinematic states in predicting the location of tracked features.

As discussed above, with embodiments of the present disclosure, when a tracked feature that appeared in prior image frames unexpectedly no longer can be identified or extracted from a subsequent image frame, image enhancement techniques are applied to the area of the image from where the tracked feature was predicted to appear.

In some embodiments, the feature tracker defines a bounded region in the image frame around an area that includes the location where each tracked feature is predicted to appear (that is, the predicted image feature location). That is, the bounded region defines a localized area within image frame where, based on the tracking of images features from one or more prior image frames, an image feature is expected to appear. In some embodiments, the size and/or shape of the bounded regions applied by the feature tracker 104 may be fixed, or predefined. In other embodiments, the size and/or shape of the bounded region may be dynamically calculated as a function of an estimated confidence, or covariance, in the predicted location of the image feature. Where the confidence in the predicted location is high (the variance of the estimated location is low), the bounded region may be relatively smaller in area as compared to when the confidence in the predicted location is low (the variance of the estimated location is high). In other embodiments, other vehicle dynamics may factor into the size of the bounded region, such as vehicle speed and/or velocity, acceleration, or vibrations (e.g., a smaller bounded region may be utilized for a vehicle travelling at slower velocity, and a larger bounded may be utilized for a vehicle travelling at a faster velocity). The bounded region need not be limited to any particular shape but may be defined using any regular or irregular geometric shape (e.g., a square, a triangle, an ellipse, etc.). For at least some embodiments, this bounded region defines a collection of pixels that may be manipulated by the dynamic localized parameter adjuster 110.

In some embodiments, when a tracked feature cannot be readily identified within the bounded region in which it is expected to appear, the dynamic localized parameter adjuster 110 executes and applies one or more image enhancement filters (for example, to adjust luminosity, contrast, hues, or other image parameter) to the bounded region associated with the missing tracked feature to attempt to make that feature sufficiently visible so that it may be identified and extracted by the feature extractor 106 and/or tracked by the feature tracker 104.

If the feature extractor 106 cannot identify the tracked feature, then the dynamic localized parameter adjuster 110 adjusts the parameters of the image in the bounded region associated with the missing image feature. This process may be repeated a number of times with different parameters if the prior iteration does not yield a sufficiently visible feature. The parameters of the image that can be adjusted by applying image correction filters may include, for example luminosity, contrast, hue, saturation, gamma, or apply other image correction filters to augment the image parameters within the bounded region. Once the image parameters have been augmented, the feature extractor 106 again searches the bounded region to determine if the missing tracked feature is now extractable from the image frame. If so, then the location of the tracked feature can be added to the feature track and provided to the feature tracker 104 for processing as described above.

Figure 2A:
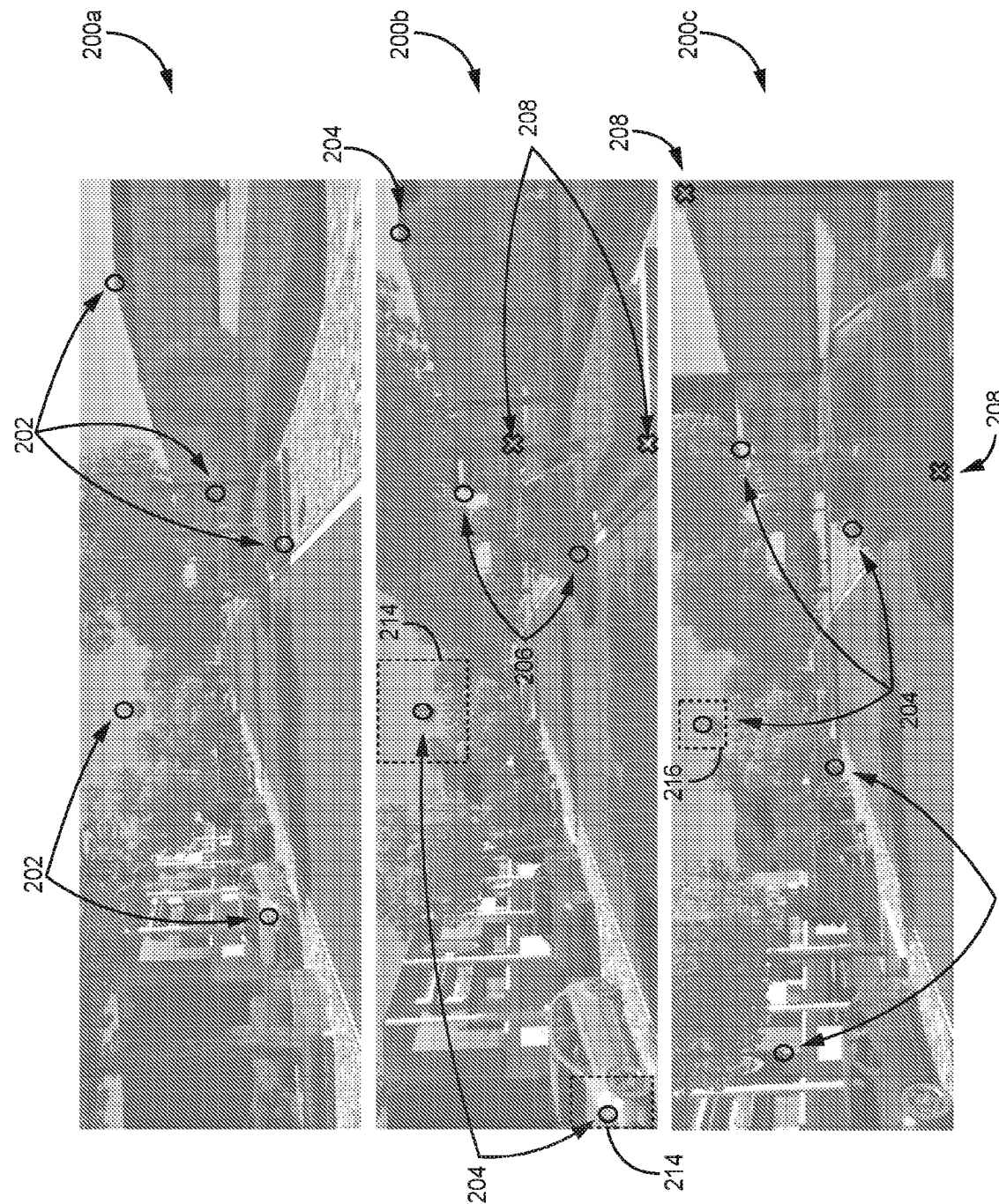
FIGS. 2A, 2B and 2C are diagrams illustrating dynamic localized image parameter adjustments for captured image frames for an example vision aided navigation system.
Figure 2B:
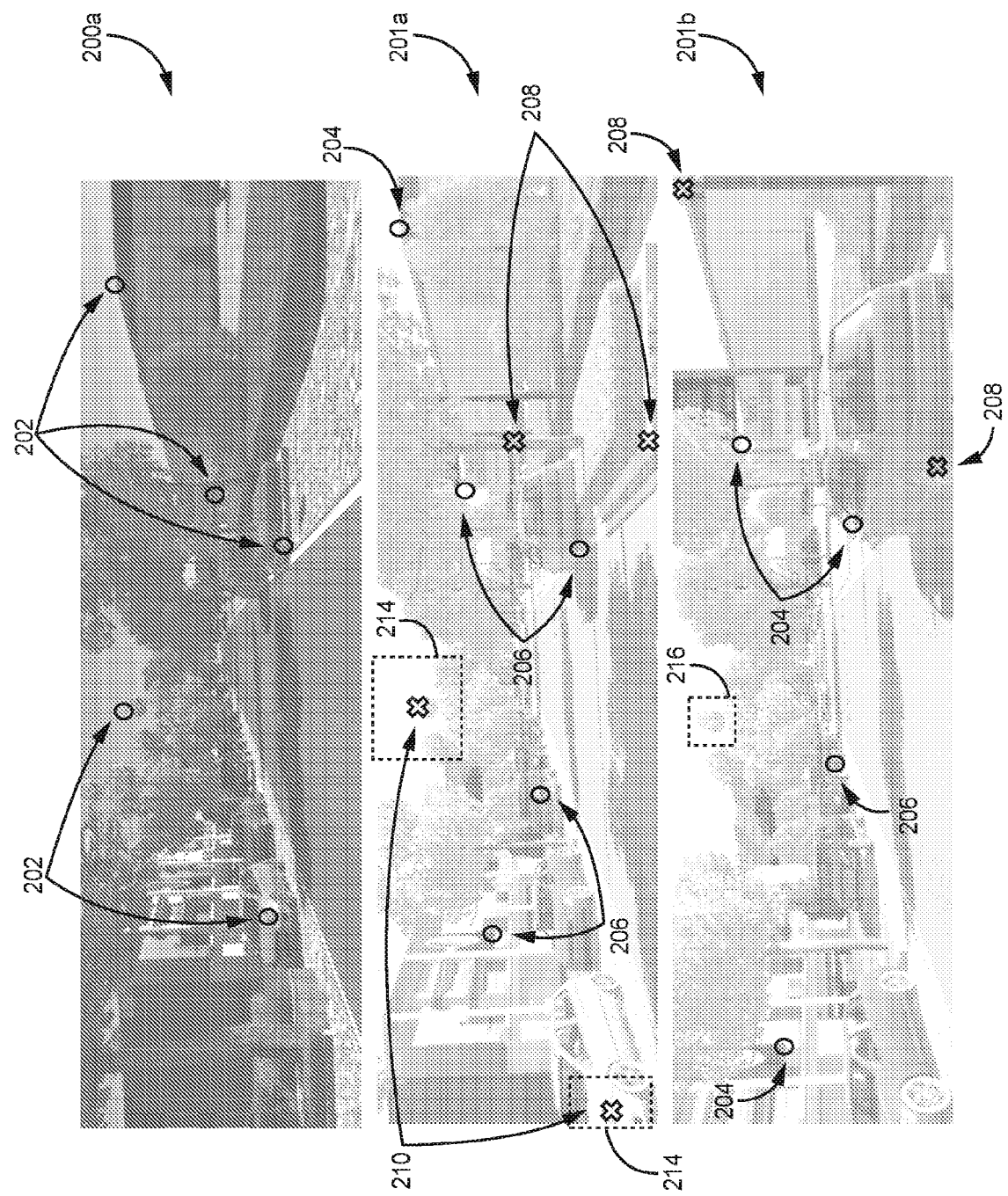
Figure 2C:
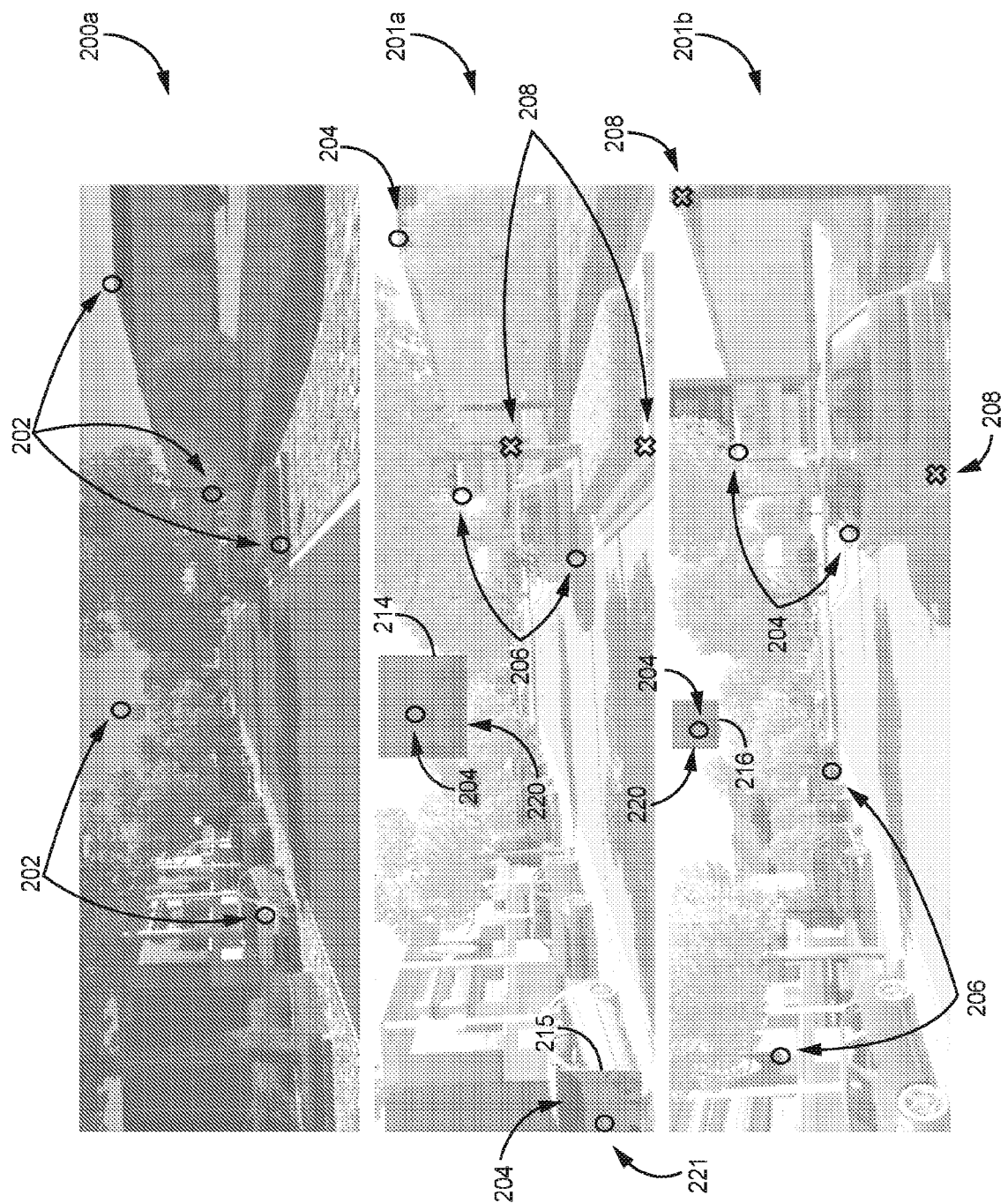

FIGS. 2A, 2B, and 2C illustrate the processing of image frames by the vision aided navigation system 100 in order to enhance the ability of the vision aided navigation enabled vehicle 100 to track image features as environmental conditions change. Each of the images in FIGS. 2A, 2B, and 2C represent image frames captured by the image sensor 102 as the vehicle 10 is in motion.

FIG. 2A depicts in image frames 200a, 200b, and 200c the operation of the vision aided navigation system 100 under optimal lighting conditions. 200b and 200c serve to contrast the image frames 201a and 201b, in FIGS. 2B, and 2C where the same image frames are shown under different environmental conditions. For example, brighter lighting may wash out image frames 201a and 201b, making it more difficult to identify features than in image frames 200b and 200c.

Beginning with image frame 200a in FIG. 2A, this image frame 200a depicts an image captured under nominal environmental conditions. In the example, a limited number of image features (shown at 202) have been identified in the image frame for extraction by the feature extractor 106. These extracted features 202 are from points of the image with identifiable features. In the particular example 200a, the identifiable extracted features 202 include a building corner, a tree-top, a corner of concrete, a sign corner, and a headlight of a car, as examples of object existing around the vehicle 10 that may be image features suitable for use as tracked features. The feature extractor 106 may be configured to extract features 202 from an image frame until either a specified number of features have been extracted or features are extracted for a preselected duration of time.

Image frame 200b shows an image captured subsequent to image frame 200a. In this image frame 200b, the feature extractor 106 again attempts to extract the previously identified features, which are now represented as tracked features 204. In this example, the feature extractor 106 was able to track and extract the building corner, the treetop, and the headlight. Those track features 204 appeared and were extractable within the bounded regions (an example of which is shown at 214) around the locations predicted by the feature tracker 104. Thus, the feature tracker 104 will update the associated feature tracks for these features 204 with the updated position of each of these identified image features. However, as indicated at 208, two of the extracted features 202 previously identified in image frame 200*a* are now considered lost features because they no longer can be identified and extracted from image frame 200*b*. In this case, the two lost features 208 in image frame 200*b* are no longer visible, possibly because of either an obstruction, as in the sign corner, or due to the feature leaving the image frame, as in the corner of the concrete, or for another reason. In some embodiments, the feature extractor 106 may decide to identify and extract two additional image features (shown at 206) to replace the lost features 208 (for example, a second sign corner to replace the first sign corner, and a car tire to replace the corner of the concrete).

Image frame 200*c* in FIG. 2A further depicts another image frame captured subsequent to image frame 200*b*. In this image 200*c*, the feature extractor 106 identifies and extracts the previously identified features 204 that were present in frame 200*b*. Those track features 204 appeared and were extractable within the bounded regions (an example of which is shown at 216) around the locations predicted by the feature tracker 104. Two of the features previously tracked in image frame 200*b* are now lost features 208 in image frame 200*c*. In this example, the lost features 208 are still in the frame but were removed as features by the feature extractor 106 due to their proximity to the edge of the image frame, and the availability of more suitable features 206.

In FIG. 2B, the image frame shown at 200*a* is the same as shown in FIG. 2A. Image frames 201*a* and 201*b* illustrate subsequently captured image frames where environmental conditions have changed such that one or more of the extracted features 202 clearly identifiable in image frame 200*a* are no longer sufficiently identifiable for extraction.

For example, in image frame 201*a*, the feature extractor 106 attempts to extract the previously identified features 202. Those image features 202 that remain extractable in frame 201*a* are now represented as tracked features 204. However, an adverse change in environmental conditions has occurred that impedes the continued tracking of one or more of those previously tracked features 202. Adverse changes in environmental conditions may include, for example, changes in lighting due to reflections, glare, shadows, cloud cover, setting of the sun, rain, snow, fog, or other environmental factors. For example, several of the previously tracked image features, which are expected to appear at locations 210, have become undetectable by the feature extractor 106 (for example, because of the change in lighting conditions). In this particular example, the bounded areas 214, 216 around the image features 210 have become too saturated for the recognition of image features. One example of an expected but undetectable feature location 210 is located at the top of a tree, where the image feature has become effectively indistinguishable from the background sky. Similarly, the headlight of a car becomes an undetectable feature at location 210, where it is indistinguishable from the white body of the car. These image features at locations 210 under nominal conditions should have still be identifiable and extractable by the feature extractor 106 because they still appear in the image sensor 102 field of view and are not blocked by an intervening object, but none-the-less remain non-extractable from the image as captured.

Image frame 201*b* in FIG. 2B shows an image captured subsequent to image frame 201*a*. This example image frame 201*b*, depicts how a change in lighting conditions can also render image features located within a large portion of the image frame indistinguishable for the purposes of searching and extracting a feature. For example, the sky generally around 216 in the image frame 201*b* is washed out due to the lighting conditions. The several potentially trackable image features in the sky would be visible if not for the adverse change in lighting conditions.

As discussed above, with embodiments of the present disclosure, when a tracked feature no longer appears where expected, image enhancement techniques are applied to the area of the image from where the tracked feature was predicted to appear. FIG. 2C illustrates application of these enhancements by the dynamic localized parameter adjuster 110 onto image frames 201*a* and 201*b*.

In FIG. 2C, the image frame 200*a* is again depicting an image captured under nominal environmental conditions. However, in FIG. 2C, the image frames 201*a* and 201*b* from FIG. 2B have now been processed by the dynamic localized parameter adjuster 110 as described above to enhance the ability of the feature extractor 106 to identify and extract what were previously undetectable features 210.

The bounded regions 214, 215, and 216 shown in FIG. 2C define the areas within the image frames 201*a*, 201*b* where the feature extractor 106 expected associated tracked features 204 to appear within based on their prior feature tracks and the motion of the vehicle 10 to a new position and angular orientation since the prior image frames were captured. In some embodiments, these bounded regions 214, 215, and 216 are also used to define subsections of the captured image frames where the dynamic localized parameter adjuster 110 adjusts one or more image characteristics to attempt to distinguish the missing image features to a sufficient degree for the feature extractor 106 to again be able to extract them.

As an example, in image frame 200*a*, the top of a tree (shown at 220) was extracted as an image feature 202. In the subsequent image frame 201*a*, the top of the tree at 220 could initially no longer be identified due to a change in lighting conditions as was shown in FIG. 2B. In FIG. 2C, one or more image parameters of the bounded region 214 that surrounds the top of the tree at 220 have been adjusted, allowing the image feature to now be an identified, extracted, and tracked image 204 within image frame 201*a*. In image frame 201*b*, the bounded region 216 is smaller than the bounded region 214 in the prior image frame 201*a* because the image feature 202's position could be determined more accurately. The success of identifying an obscured feature can be increased in many ways including, but not limited to, the duration of the feature track, the consistency of the of the feature position in the image frame, the relative motion of the feature to the moving vehicle in prior image frames, or the degree of contrast between pixels of the feature. As another example, a similar augmentation was applied to the bounded region 215 to an undetectable feature 210 (the headlight of the car as shown at 221).

In the image from 201*b* captured subsequent to image frame 201*a*, the bounded region 216 for enhancing the top of the tree at 220 is now smaller than the bounded region 214 utilized for that same feature in image frame 201*a*. As discussed above, in some embodiments, the size of the bounded regions may be determined as a function of many factors. For example, in the image 201*b*, the top of the tree identified as an image feature 202 in the image frame 200*a* doesn't change position greatly between image frames. Because of this, the bounded region 216 could be smaller based on the increased confidence of the feature position and/or the decreased variance of the estimated location of the feature. In other implementations, the bounded region 216 could be smaller because the top of the tree at 220 has been categorized by the feature extractor 104 as a static object and/or because the speed of the vehicle 10 has reduced relative to the top of the tree.

Figure 3:
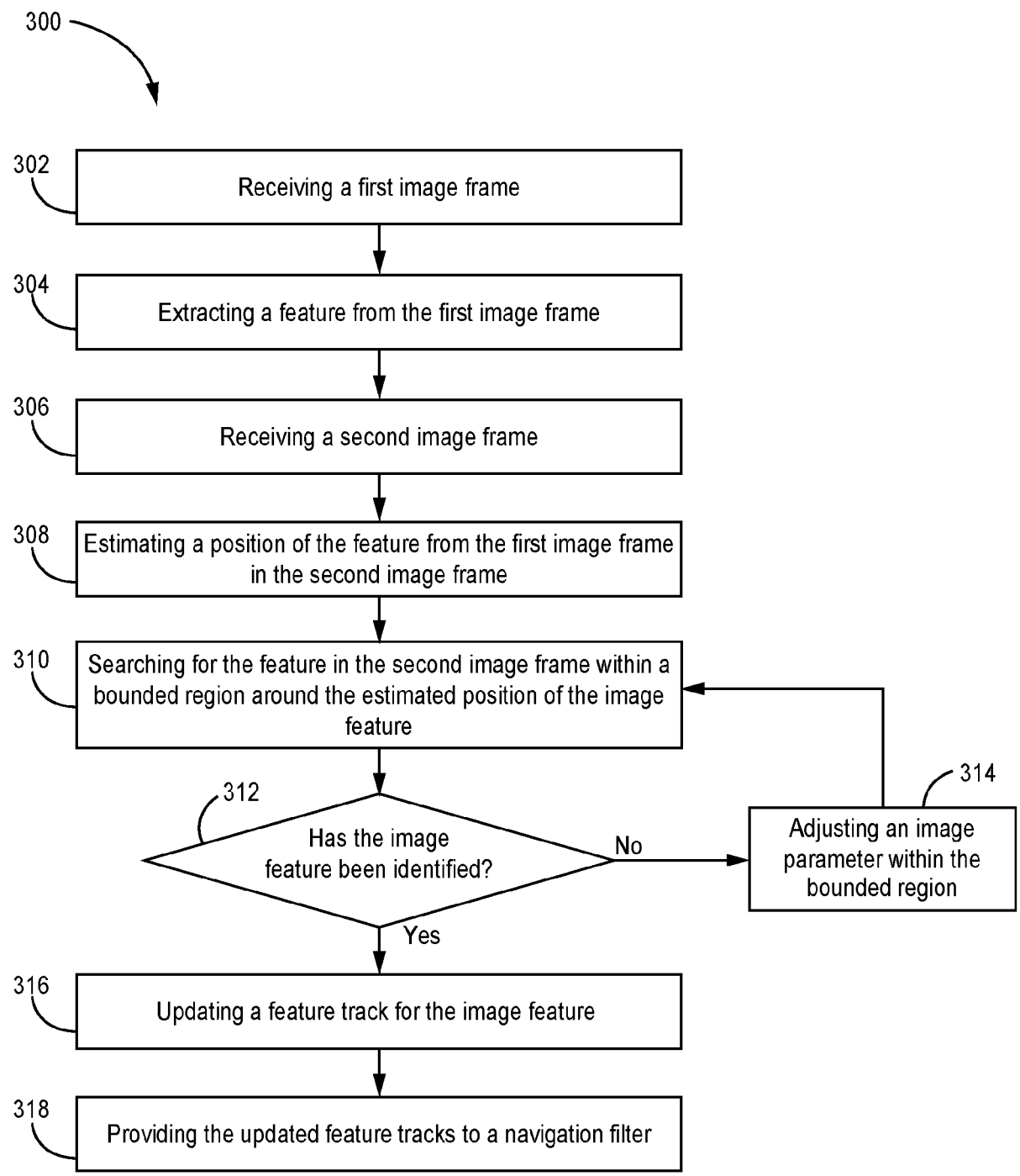
FIG. 3 is a flow chart demonstrating an example embodiment of a method for vision aided navigation using dynamic localized image parameter adjustments.

FIG. 3 illustrates an example embodiment of a method 300 for vision aided navigation. It should be understood that the features and elements described herein with respect to the method shown in FIG. 3 and the accompanying description may be used in conjunction with, in combination with, or substituted for elements of any of the other embodiments discussed herein, and vice versa. Further, it should be understood that the functions, structures, and other description of elements associated with embodiments of FIG. 3 may apply to like named or described elements for any of the Figures and embodiments and vice versa.

In some embodiments, the method 300 may be executed as one or more algorithms by one or more components of the vision aided navigation system 100. Further, in some embodiments, the method 300 is performed as an iterative process using reference to information from prior iterations of the method. Thus, it should be understood that different identifiers can be used to describe the same piece of information at different points in the iterative process. Conversely, it should be understood that one identifier can be used to describe different pieces of information at different points in the iterative process.

Method 300 begins at 302 with receiving a first image frame. In some embodiments, an image sensor device collects visual information from a surrounding environment and produces a streaming output of image frames. In some embodiments, the image frame is a two-dimensional pixelated image where the pixels of the image frame are identifiable via coordinates and can be referenced in relation to prior or subsequent image frames. In other embodiments, image frames may represent features in other ways, such as through vector coordinates.

The method 300 proceeds to 304 with extracting one or more image features from the first image frame. The image features extracted at 304 are features having characteristics relative to their background such as to be recognizable and distinguishable from their background as an object that exists in the environment of the vehicle 10. In some examples, a feature extraction algorithm, e.g. ORB, SIFT, SURF or another feature extraction algorithm, may be used. Once the image features are identified, the image features are extracted from the image. Extracting an image feature consists of identifying a region of the image frame as a potential image feature, labeling the region as an image feature, and adding the image feature to a stored list of image features. In some embodiments, this step may be repeated until all the possible image features have been extracted. In other embodiments, this step repeats until either the number of image features stored in the list equals a predetermined number of image features or for a preset duration of time.

The method 300 proceeds to 306 with receiving a second image frame. The second image is received from an image sensor device at a point in time after the first image is captured at 302.

For example, the second image should be captured within a period of time such that featured extracted in the first image may still be expected to appear in the second image given the vehicle's rate and direction of motion.

The method proceeds to 308 with estimating a position of the image features from the first image frame in the second image frame. An extracted image feature has an associated feature track which contains a list of the image feature's positions, as well as the mean and variance of the feature's positions, in prior image frames. The feature track can be used to estimate the position statistics of the image feature based on the relative motion of the image sensor device and an image feature between image frames, thus the position statistics of the image feature can be predicted in the second frame. In some examples, the feature track is used in conjunction with the estimated kinematic states of the vehicle to predict the position statistics of the image feature based on the motion and position of the vehicle in relation to the image feature in prior image frames. In some examples, the position of the image feature is estimated as within the area of the bounded region, as discussed above. This bounded region is an area within which the image feature is predicted to be located based on the estimated statistics of the feature track and the kinematic states of the vehicle.

The method proceeds to 310 with searching for the features in the second image frame within a bounded region around the estimated position of each image feature. As each feature has certain characteristics, these characteristics can be used to determine whether an identified feature is the image feature.

The method proceeds to 312 with determining if the expected image feature has been identified within the bounded region. If the image feature has been identified within the proximity area, then the process continues proceeds to 316. If the image feature has not been identified within the bounded region, then the process proceeds to 314 with adjusting the parameters of the image within the bounded region.

At 314, the method comprises adjusting the parameters of the image within the bounded region around the estimated position of the feature. The image frame has certain inherent parameters that can be adjusted or augmented, for example, luminance, contrast, and gamma. The parameters of the bounded region can be augmented as can the parameters of the image frame. In some embodiments, the bounded region has a fixed size and shape, consistent for every feature. In other embodiments, the size and shape of the bounded region can be dynamically adjusted. There are several factors that can contribute to the dynamic adjustment of the bounded region including the position of the feature within the image frame, the relative motion of the feature within the plurality of image frames, and the feedback from the navigation filter. The position of the feature within the image frame can be influenced by the expected motion of the vehicle. For example, when a vehicle is moving in a constant direction with a constant speed, a feature in the middle of the image frame is more likely to move few pixels than a feature on the edge of the image frame. Similarly, if a feature has a relatively large change in location between successive image frames, then the feature is more likely to change position in a subsequent image frame.

The method proceeds to 316 with updating a feature track for the image feature. When an image feature is identified within the bounded region, the image feature's position is added to the feature track. In addition, the feature track is updated to include a track of the relative motion of the image feature progressively through the previous image frames. If an image feature was not found within the proximity area, then the corresponding feature track is removed and the image feature is no longer in the current list of tracked image features.

In some embodiments, if a feature has not been identified after a number of iterations of attempting to adjust the image, then the process may continue to 316 with the image feature removed from the image feature list. There are many reasons that an image feature may not be found. The image feature could be obscured by another object in the image frame. The image feature could be outside of the bounded region. As well, the image feature could have simply departed the image frame entirely. If an image feature has been removed during this step, then in the subsequent iteration a new feature is extracted to replace the removed feature. In some embodiments, the number of extracted features is not constant and more or fewer features may be tracked in any given iteration.

As well, a navigation filter can provide feedback to influence the bounded region. As discussed in 318, the navigation filter receives a feature track associated with each filter. The navigation filter, or a separate system, can use the feature tracks to estimate the position and velocity statistics of the vehicle. The estimated position and velocity statistics of the vehicle can be used to estimate the position statistics of a feature.

The method continues to 318, with providing the updated feature tracks to a navigation filter. Once a requisite number of tracked features have been identified and their feature tracks updated, then the latest position statistics and the feature track of the tracked features are provided to the navigation filter as a navigation aid for calculating a navigation solution for the vehicle. The updated feature tracks are used to estimate the position and velocity statistics of the vehicle.

EXAMPLE EMBODIMENTS

Example 1 includes a vision aided navigation system, the system comprising: at least one image sensor, wherein the at least one image sensor is configured to produce a plurality of image frames of a surrounding environment; a feature extractor coupled to the at least one image sensor, wherein the feature extractor is configured to extract at least one image feature from a first image frame from the plurality of image frames captured by the at least one image sensor; a navigation filter configured to output a navigation solution based on an input of navigation data from at least one navigation device and further based on changes in position of the at least one image feature in the plurality of images; a feature tracker configured to receive the plurality of image frames and configured to predict a location of the at least one image feature in at least one subsequent image frame taken by the at least one image sensor; a dynamic localized parameter adjuster configured to adjust at least one image parameter of the at least one subsequent image frame; and wherein the feature tracker is configured so that when the at least one image feature cannot be identified in the at least one subsequent image frame within a bounded region around the predicted location, the dynamic localized parameter adjuster adjusts the at least one image parameter within the bounded region.

Example 2 includes the system of Example 1, wherein the at least one image parameter comprises at least one of luminance, contrast, and gamma.

Example 3 includes the system of any of Examples 1-2, wherein the at least one navigation device comprises at least one of an inertial measurement unit or a global navigation satellite system receiver.

Example 4 includes the system of any of Examples 1-3, further comprising a processor coupled to a memory, wherein at least one of the feature extractor, the feature tracker, the dynamic localized parameter adjuster, or the navigation filter are executed by the processor.

Example 5 includes the system of Example 4, wherein the plurality of image frames are stored in the memory.

Example 6 includes the system of any of Examples 4-5, wherein a feature track is associated with the at least one image feature, wherein the feature track comprises a location of the at least one image feature in each of the plurality of images, and wherein the feature track is stored in the memory.

Example 7 includes the system of Example 6, wherein when the at least one image feature cannot be identified in the subsequent image after the dynamic localized parameter adjuster adjusts the at least one image parameter, then the feature track of the at least one image feature is deleted from the memory, and at least one new image feature is extracted to replace the at least one image feature.

Example 8 includes the system of any of Examples 1-7, wherein the bounded region can be either a predefined area or a dynamically adjusted area as a function of at least one of: the predicted location of the at least one image feature in the at least one subsequent image frame; a feedback from the navigation filter; or a change in position of the at least one image feature across the plurality of image frames.

Example 9 includes the system of any of Examples 6-7, wherein the bounded region comprises an area determined as a function of one or more of: the feature track, the location of the at least one image feature, a variance of the predicted location of the image feature position, and a change in the location of the at least one image feature in the plurality of image frames.

Example 10 includes the system of any of Examples 1-9, wherein the navigation solution is for a vehicle comprising one of an automobile, an airplane, a seaworthy vessel, a train, a vertical takeoff and landing vehicle, or a submersible vehicle.

Example 11 includes the system of any of Examples 1-10, wherein the feature tracker is configured to predict the location of the at least one image feature in the plurality of image frames as a function of a location of the at least one image feature in the first image frame and a change in the navigation solution estimated by the navigation filter.

Example 12 includes a method for a vision aided navigation system, the method comprising: receiving a first image frame; extracting at least one image feature from the first image frame; receiving a second image frame; estimating a location of the at least one image feature in the second image frame; searching for the at least one image feature within a bounded region around the estimated location of the at least one image feature; the at least one image feature cannot be identified, adjusting at least one image parameter within the bounded region around the estimated location of the at least one image feature; updating a feature track associated with the at least one image feature; and providing the feature track to a navigation filter.

Example 13 includes the method of Example 12, wherein the feature track comprises a location of the at least one feature in each of the plurality of image frames.

Example 14 includes the method of any of Examples 12-13, wherein the bounded region can be either a predefined area or a dynamically adjusted area as a function of at least one of: the location of the at least one feature in the second image frame; a feedback from the navigation filter; or a change in location of the feature across a plurality of image frames.

Example 15 includes the method of any of Examples 12-14, wherein the at least one image parameter comprises at least one of luminance, contrast, and gamma.

Example 16 includes the method of any of Examples 12-15, wherein when the at least one image feature cannot be identified after the at least one image parameter has been adjusted, removing the feature track associated with the at least one image feature and extracting at least one new image feature.

Example 17 includes the method of any of Examples 12-16 further comprising, determining a position and a velocity from the feature tracks associated with the at least one image feature.

Example 18 includes a vision aided navigation system, the system comprising: a processor coupled to a memory, wherein the processor executes code to implement: a feature extractor coupled to at least one image sensor, wherein the at least one image sensor outputs a plurality of image frames that capture a surrounding environment, wherein the feature extractor is configured to extract at least one image feature from a first image frame of the plurality of image frames taken by the at least one image sensor; a feature tracker configured to predict a location of the at least one image feature in a second image frame from the plurality of image frames taken by the at least one image sensor as a function of the location of the at least one image feature in the first image frame and a navigation solution estimated by a navigation filter, wherein the navigation filter is configured to estimate the navigation solution based on an input of navigation data from at least one navigation device and tracking of the location of the at least one image feature between the first image frame and the second image frame; and a dynamic localized parameter adjuster configured to adjust at least one image parameter of the second image frame; and wherein the feature tracker is configured so that when the at least one image feature cannot be identified in the second image frame within a bounded region around the predicted location, the dynamic localized parameter adjuster adjusts the at least one image parameter within the bounded region.

Example 19 includes the system of Example 18, wherein the at least one image parameter comprises at least one of luminance, contrast, and gamma.

Example 20 includes the system of any of Examples 18-19, wherein a feature track is associated with the at least one image feature, wherein the feature track comprises the location of the at least one feature in each of the plurality of image frames, and wherein the feature track is provided as an input to the navigation filter.

In various alternative embodiments, system and/or device elements, method steps, or example implementations described throughout this disclosure (such as any of the vision aided navigation system, or sub-parts of any thereof, for example) may be implemented at least in part using one or more computer systems, field programmable gate arrays (FPGAs), or similar devices comprising a processor coupled to a memory and executing code to realize those elements, steps, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High-Speed Integrated Circuit (VHSIC) Hardware Description Language (VHDL).

As used herein, terms such as "processor", "image sensor", "navigation unit", "inertial measurement unit", "GNSS receiver, each refer to non-generic device elements of a navigation system that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A vision aided navigation system, the system comprising:
    at least one image sensor, wherein the at least one image sensor is configured to produce a plurality of image frames of a surrounding environment;
    a feature extractor coupled to the at least one image sensor, wherein the feature extractor is configured to extract at least one image feature from a first image frame from the plurality of image frames captured by the at least one image sensor;
    a navigation filter configured to output a navigation solution based on an input of navigation data from at least one navigation device and further based on changes in position of the at least one image feature in the plurality of images;
    a feature tracker configured to receive the plurality of image frames and configured to predict a location of the at least one image feature in at least one subsequent image frame taken by the at least one image sensor; and
    a dynamic localized parameter adjuster configured to adjust at least one image parameter of the at least one subsequent image frame;
    wherein a feature track is associated with the at least one image feature, wherein the feature track comprises a location of the at least one image feature in each of the plurality of images, and wherein the feature track is stored in the memory;
    wherein the feature tracker is configured so that when the at least one image feature cannot be identified in the at least one subsequent image frame within a bounded region around the predicted location, the dynamic localized parameter adjuster adjusts the at least one image parameter within the bounded region ;
    wherein when the at least one image feature cannot be identified in the subsequent image after the dynamic localized parameter adjuster adjusts the at least one image parameter, then the feature track of the at least one image feature is deleted from the memory, and at least one new image feature is extracted to replace the at least one image feature.

2. The system of claim 1, wherein the at least one image parameter comprises at least one of luminance, contrast, and gamma.

3. The system of claim 1, wherein the at least one navigation device comprises at least one of an inertial measurement unit or a global navigation satellite system receiver.

4. The system of claim 1, further comprising a processor coupled to a memory, wherein at least one of the feature extractor, the feature tracker, the dynamic localized parameter adjuster, or the navigation filter are executed by the processor.

5. The system of claim 1, wherein the plurality of image frames are stored in the memory.

6. The system of claim 1, wherein the bounded region can be either a predefined area or a dynamically adjusted area as a function of at least one of:
   the predicted location of the at least one image feature in the at least one subsequent image frame;
   a feedback from the navigation filter; or
   a change in position of the at least one image feature across the plurality of image frames.

7. The system of claim 1, wherein the bounded region comprises an area determined as a function of one or more of: the feature track, the location of the at least one image feature, a variance of the predicted location of the image feature position, and a change in the location of the at least one image feature in the plurality of image frames.

8. The system of claim 1, wherein the navigation solution is for a vehicle comprising one of an automobile, an airplane, a seaworthy vessel, a train, a vertical takeoff and landing vehicle, or a submersible vehicle.

9. The system of claim 1, wherein the feature tracker is configured to predict the location of the at least one image feature in the plurality of image frames as a function of a location of the at least one image feature in the first image frame and a change in the navigation solution estimated by the navigation filter.

10. A vision aided navigation system, the system comprising:
   a processor coupled to a memory, wherein the processor executes code to implement:
      a feature extractor coupled to at least one image sensor, wherein the at least one image sensor outputs a plurality of image frames that capture a surrounding environment, wherein the feature extractor is configured to extract at least one image feature from a first image frame of the plurality of image frames taken by the at least one image sensor;
      a feature tracker configured to predict a location of the at least one image feature in a second image frame from the plurality of image frames taken by the at least one image sensor as a function of the location of the at least one image feature in the first image frame and a navigation solution estimated by a navigation filter, wherein the navigation filter is configured to estimate the navigation solution based on an input of navigation data from at least one navigation device and tracking of the location of the at least one image feature between the first image frame and the second image frame; and
      a dynamic localized parameter adjuster configured to adjust at least one image parameter of the second image frame by applying an image correction filter;
      wherein a feature track is associated with the at least one image feature, wherein the feature track comprises the location of the at least one image feature in each of the plurality of image frames, and wherein the feature track is stored in the memory;
   wherein the feature tracker is configured so that when the at least one image feature cannot be identified in the second image frame within a bounded region around the predicted location, the dynamic localized parameter adjuster adjusts the at least one image parameter within the bounded region by applying the image correction filter;
   wherein the bounded region comprises an area determined as a function of one or more of: the feature track, the location of the at least one image feature, a variance of a predicted location of an image feature position, and a change in the location of the at least one image feature in the plurality of image frames.

11. The system of claim 10, wherein the at least one image parameter comprises at least one of luminance, contrast, and gamma.

12. The system of claim 10, wherein the feature track is provided as an input to the navigation filter.

* * * * *